(12) United States Patent
Minowa et al.

(10) Patent No.: US 8,749,683 B2
(45) Date of Patent: Jun. 10, 2014

(54) DRIVING METHOD OF SOLID-STATE IMAGING DEVICE

(71) Applicant: Canon Kabushiki Kaisha, Tokyo (JP)

(72) Inventors: Masaaki Minowa, Kawasaki (JP); Akira Okita, Yamato (JP); Hidekazu Takahashi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 13/685,459

(22) Filed: Nov. 26, 2012

(65) Prior Publication Data

US 2013/0147996 A1  Jun. 13, 2013

(30) Foreign Application Priority Data

Dec. 9, 2011  (JP) ................. 2011-270314

(51) Int. Cl.
*H04N 3/14* (2006.01)
*H04N 5/335* (2011.01)
*H04N 5/217* (2011.01)

(52) U.S. Cl.
USPC ............ 348/308; 348/301; 348/312; 348/241

(58) Field of Classification Search
CPC ....... H04N 5/378; H04N 5/363; H04N 5/369; H04N 5/3575; H04N 5/3745; H01L 27/14609
USPC ................. 348/301, 308, 312, 241, 294, 296; 257/291, 292; 250/208.1
See application file for complete search history.

(56) References Cited

U.S. PATENT DOCUMENTS

| 6,791,613 | B2 * | 9/2004 | Shinohara et al. ............ 348/308 |
| 7,321,110 | B2 | 1/2008 | Okita et al. ................ 250/208.1 |
| 7,324,144 | B1 * | 1/2008 | Koizumi ........................ 348/296 |
| 7,466,003 | B2 | 12/2008 | Ueno et al. ..................... 257/462 |
| 7,538,810 | B2 | 5/2009 | Koizumi et al. .............. 348/308 |
| 7,550,793 | B2 | 6/2009 | Itano et al. ..................... 257/239 |
| 7,741,593 | B2 | 6/2010 | Iwata et al. ............... 250/214 R |
| 7,787,037 | B2 | 8/2010 | Ono et al. ...................... 348/296 |
| 7,817,199 | B2 | 10/2010 | Yamashita et al. ............ 348/308 |
| 7,872,286 | B2 | 1/2011 | Okita et al. ..................... 257/291 |
| 7,978,241 | B2 * | 7/2011 | Koizumi et al. .............. 348/294 |
| 8,009,213 | B2 | 8/2011 | Okita et al. .................... 348/300 |
| 8,081,245 | B2 | 12/2011 | Itano et al. .................... 348/301 |
| 8,106,955 | B2 | 1/2012 | Okita et al. ................. 348/220.1 |

(Continued)

FOREIGN PATENT DOCUMENTS

JP       2000-201300      7/2000

*Primary Examiner* — Nhan T Tran
(74) *Attorney, Agent, or Firm* — Fitzpatrick, Cella, Harper & Scinto

(57) ABSTRACT

In a driving method of device having plural pixels, each pixel comprises photoelectric converter, floating diffusion, transfer transistor to transfer charge of the photoelectric converter to the floating diffusion, amplifying transistor to amplify signal based on the transferred charge, and reset transistor to reset voltage of the floating diffusion, the method comprises first step of, after putting the transfer transistor into conduction state, resetting the charge of the photoelectric converter by putting the transfer transistor into non-conduction state in non-conduction state of the reset transistor, and second step of, after the first step and after putting the transfer transistor into the conduction state, transferring the charge of the photoelectric converter to the floating diffusion by putting the transfer transistor into the non-conduction state in the non-conduction state of the reset transistor, and the signal based on the charge transferred in the second step is amplified by the amplifying transistor.

12 Claims, 5 Drawing Sheets

(56) References Cited

U.S. PATENT DOCUMENTS

| | | | |
|---|---|---|---|
| 8,158,920 B2 | 4/2012 | Suzuki et al. | 250/208.1 |
| 8,159,573 B2 | 4/2012 | Suzuki et al. | 348/294 |
| 8,199,235 B2 | 6/2012 | Okita et al. | 348/301 |
| 8,218,042 B2 * | 7/2012 | Miyatake et al. | 348/294 |
| 8,278,613 B2 | 10/2012 | Okita et al. | 250/214 A |
| 8,400,546 B2 | 3/2013 | Itano et al. | 348/308 |
| 2001/0028066 A1 * | 10/2001 | Shinohara et al. | 257/215 |
| 2009/0207291 A1 * | 8/2009 | Abe et al. | 348/308 |
| 2009/0237544 A1 * | 9/2009 | Hiyama et al. | 348/308 |
| 2010/0182465 A1 | 7/2010 | Okita | 348/273 |
| 2011/0157398 A1 | 6/2011 | Okita et al. | 348/222.1 |

* cited by examiner

DRIVING METHOD OF SOLID-STATE IMAGING DEVICE

BACKGROUND OF THE INVENTION

1. Field of the Invention

The present embodiment relates to a driving method of a solid-state imaging device.

2. Description of the Related Art

A solid-state imaging device is generally constituted by pixels arranged like a two-dimensional array, a vertical scanning circuit and a horizontal scanning circuit respectively driving photoelectric conversion signals in the pixels, a reading circuit, and the like. Further, each pixel is generally constituted by a photoelectric conversion unit, a transfer transistor for transferring a signal charge, a reset transistor for resetting the photoelectric conversion unit, and the like. A charge accumulation operation is started at the point of changing the transfer transistor from a conduction state to a non-conduction state by resetting the photoelectric conversion unit with use of the reset transistor, and is terminated at the point of starting the charge transfer from the photoelectric conversion unit to an FD (floating diffusion) region with use of the transfer transistor. Such a period is called an accumulating period. If the photoelectric conversion unit cannot be reset completely and thus a residual charge still exists, a residual image and a noise are caused.

Japanese Patent Application Laid-Open No. 2000-201300 discloses a technique of, in case of performing a reset operation, putting both a reset transistor and a transfer transistor into conduction. More specifically, when the reset operation is started, the transfer transistor is first put into conduction, and the reset transistor is then put into conduction. By such an operation, residual charges in a photoelectric conversion unit are reduced, and thus residual images and noises are reduced.

To cope with an increase of the number of pixels and an increase of operation speed in the field of digital cameras, each pixel in the solid-state imaging device has been decreased in size year by year. In association with such a tendency, a power supply voltage has been decreased, whereby it becomes necessary to design the solid-state imaging device in a further microfabrication size. Incidentally, since the elements to be provided in the pixel are arranged in mutually close to others in accordance with miniaturization of the pixel size, a parasitic capacitance is increased. For example, when the photoelectric conversion unit is reset by the method disclosed in Japanese Patent Application Laid-Open No. 2000-201300, a change of the gate voltage in case of putting the reset transistor into a non-conduction state changes the voltage in the FD region through the above parasitic capacitance, whereby a problem that the residual charges are increased becomes serious. This is because a change of the potential in the FD region acts on a direction in which it is difficult for the transfer transistor to transfer the charge.

Further, in such a state that it is difficult to transfer the charge, dullness of a pulse to be applied to the gate of the transfer transistor actually affects a quantity of the residual charges due to a time constant of the gate line of the transfer transistor extending in the row direction. Since the dullness of the pulse to be applied to the gate line is different according to a position on the transfer line, a noise output may be slant along the horizontal direction of a screen. Here, a noise output waveform having gradation in a direction parallel to the horizontal scanning direction of the solid-state imaging device is called "horizontal shading". Since the horizontal shading may appear in un-ignorable way particularly in a dark portion of a taken image and a portion that brightness of a subject is low, it is desired to reduce the horizontal shading like this.

Therefore, an object of the embodiment of the present invention is to provide a driving method of a solid-state imaging device, by which it is possible to reduce a horizontal shading which is caused by incompleteness of resetting.

SUMMARY OF THE INVENTION

A driving method of a solid-state imaging device according to the present embodiment is characterized by a driving method of a solid-state imaging device having a plurality of two-dimensionally arranged pixels, wherein: each of the plurality of pixels comprises a photoelectric conversion unit, a floating diffusion, a transfer transistor configured to transfer a charge of the photoelectric conversion unit to the floating diffusion, an amplifying transistor configured to amplify a signal based on the charge transferred to the floating diffusion, and a reset transistor configured to reset a voltage of the floating diffusion; the driving method comprises a first step of, after putting the transfer transistor into a conduction state, resetting the charge of the photoelectric conversion unit by putting the transfer transistor into a non-conduction state in a non-conduction state of the reset transistor, and a second step of, after the first step and after putting the transfer transistor into the conduction state, transferring the charge of the photoelectric conversion unit to the floating diffusion by putting the transfer transistor into the non-conduction state in the non-conduction state of the reset transistor; and the signal based on the charge transferred in the second step is amplified by the amplifying transistor.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
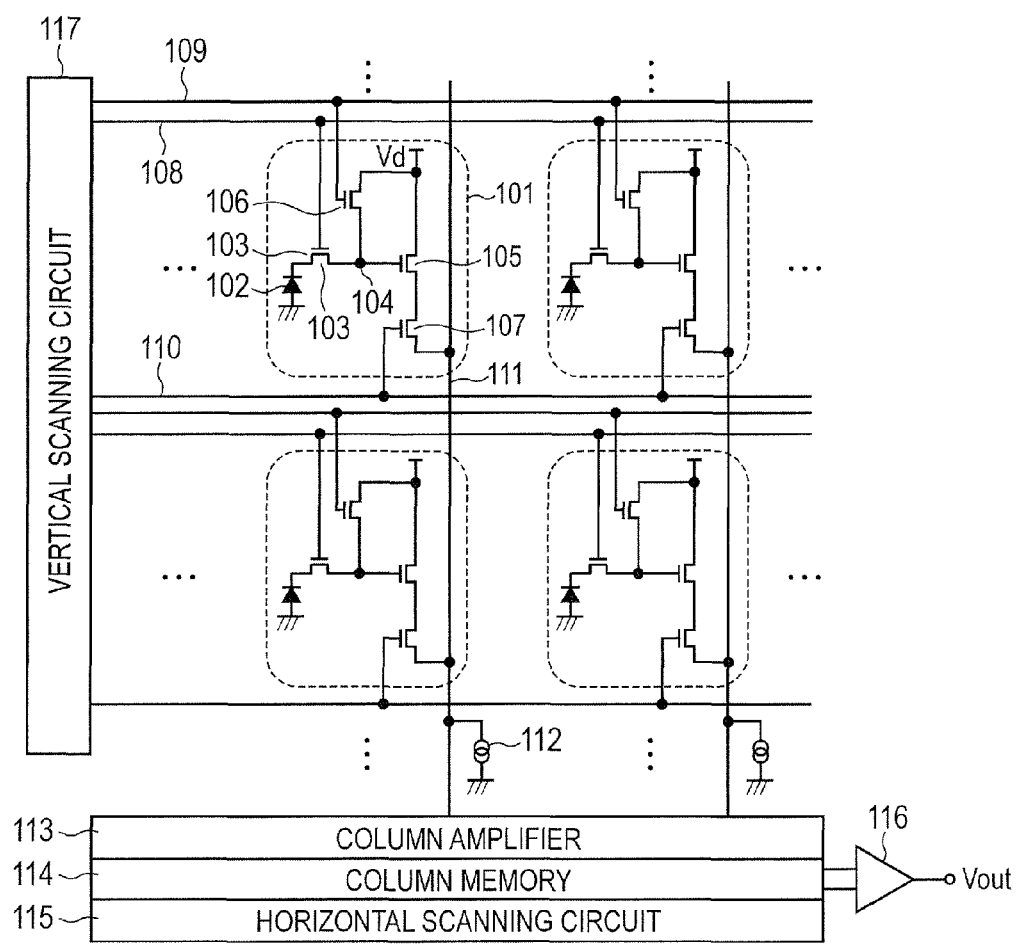
FIG. 1 is a diagram illustrating a constitution example of a solid-state imaging device according to a first embodiment.

FIG. 1 is a diagram indicating a constitutional example of a CMOS (Complementary Metal Oxide Semiconductor) solid-state imaging device according to the first embodiment. Plural pixels 101 are two-dimensionally arranged and each of the plural pixels 101 has a photoelectric conversion unit 102, a transfer transistor 103, a floating diffusion (FD) 104, an amplifying transistor 105, a reset transistor 106 and a selection transistor 107. The photoelectric conversion unit 102 generates a charge by photoelectric conversion, and the FD 104 converts the charge into voltage. The transfer transistor 103 transfers the electric discharge of the photoelectric conversion unit 102 to the FD 104. The amplifying transistor 105 amplifies a signal which is based on the electric discharge transferred to the FD 104. The reset transistor 106 resets the voltage of the FD 104. In addition, drive wires 108 to 110 used for driving the pixels 101 are connected to the pixels 101. Drive signals are input to the drive wires 108 to 110 from a vertical scanning circuit 117. The photoelectric conversion unit 102 generates the signal charge by a photoelectric conversion and accumulates the signal charge. The signal charge generated at the photoelectric conversion unit 102 is converted into the voltage at the FD 104. A signal which is based on the electric discharge transferred to the FD 104 is amplified by the amplifying transistor 105. Thereafter, the amplified signal is output to a vertical output line 111, and the signal is sampled to a column memory 114 after processed at a column circuit 113. A current source 112 is connected to the vertical output line 111. The signals written in the column memory 114 are sequentially transmitted to an end-stage amplifier 116 by a horizontal scanning circuit 115, and these transmitted signals are output after amplified. As the column circuit 113, an amplifying circuit, a noise reduction circuit, an analog-to-digital conversion circuit or the like can be included.

In order to clarify the characteristic and the constitution of the present embodiment, a timing chart in a comparative example in case of driving a circuit illustrated in FIG. 1 will be exemplified in the following.

Figure 2:
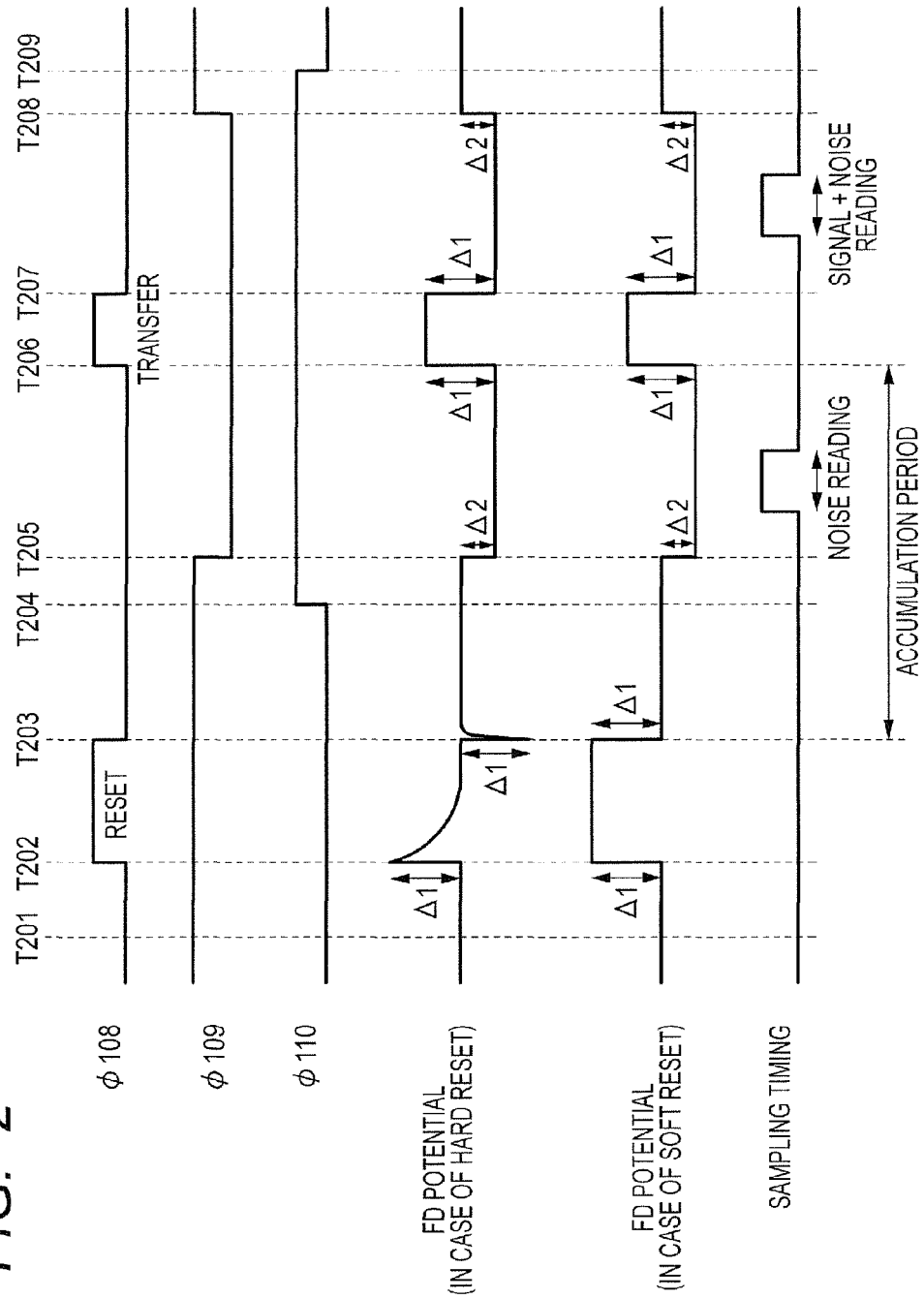
FIG. 2 is a driving timing chart in a comparison example.

FIG. 2 is a drive timing chart indicating drive signals of pixel in a comparative example, the potential of the FD 104 and a sampling timing of signals. Drive signals φ108 to φ110 are respectively input in the drive wires 108 to 110 illustrated in FIG. 1. The sampling timing could be such timing when a signal is sampled, for example, in the column memory illustrated in FIG. 1. A portion written as a read-out of noise could be a noise of the column circuit in case of including a pixel noise and the column circuit.

First, at a time T201, the potential of the drive signals φ108 and φ110 is in a low-level, and the potential of the drive signal φ109 is in a high-level. At this time, the transfer transistor 103 and the selection transistor 107 are in a non-conduction state, and the reset transistor 106 is in a conduction state. Here, the power supply voltage of pixel is denoted as Vd, the high-level potential of the drive signal φ109 is denoted as Vh and the threshold voltage of the reset transistor 106 is denoted as Vth_res. Then, when a relationship in the following expression (1) is held among these potentials, the reset transistor 106 operates in a triode region, and the potential of the FD 104 at the time T201 becomes the voltage Vd. A state of holding the expression (1) is called as a "hard reset state".

$$Vd < Vh - Vth\_res \quad (1)$$

On the other hand, when a relationship in the following expression (2) is held, the reset transistor 106 operates in a saturation region, and the potential of the FD 104 at the time T201 becomes the voltage Vh−Vth_res. A state of holding the expression (2) is called as a "soft reset state".

$$Vd > Vh - Vth\_res \quad (2)$$

At a time T202, the potential of the drive signal φ108 is set to become a high level, and the reset transistor 106 is made to be conductive. The photoelectric conversion unit 102 is reset before starting to accumulate the signal charge by a process that the transfer transistor 103 is made to be conductive in a state that the reset transistor 106 was made to be conductive, and the residual charge which causes a residual image or a noise can be reduced. At this time, a gate of the transfer transistor 103 and the FD 104 are coupled by the capacitive coupling owing to the capacitance between a gate and a drain of the transfer transistor 103, and when the potential of the drive signal φ108 is raised from a low level to a high level, the potential of the FD 104 is also raised by Δ1. According to this fact, in case of the hard reset state, the potential of the FD 104 becomes the voltage Vd+Δ1.

When the following expression (3) is held, the reset transistor 106 operates in the triode region, and the potential of the FD 104, which was raised to the voltage Vd+Δ1, immediately returns to the voltage Vd.

$$Vd + \Delta 1 < Vh - Vth\_res \quad (3)$$

When the following expression (4) is held, the reset transistor 106 operates in the saturation region, and the potential of the FD 104 gradually drops to the voltage Vd as indicated in a case of the hard reset state in FIG. 2

$$Vd + \Delta 1 > Vh - Vth\_res \quad (4)$$

On the other hand, in case of the soft reset state, the potential of the FD 104 is raised to the voltage Vh−Vth_res+Δ1 at the time T202. According to this fact, the reset transistor 106 is turned off, and the potential of the FD 104 is kept to be the voltage Vh−Vth_res+Δ1.

At a time T203, the potential of the drive signal φ108 is set to become a low level, and a reset of the photoelectric conversion unit 102 is terminated. The potential of the FD 104, which is capacitive coupled with the gate of the transfer transistor 103, is dropped by Δ1 due to a fact that the potential of the drive signal φ108 was dropped from a high level to a low level. According to this fact, in case of the hard reset state, after the potential of the FD 104 has been momentarily dropped to the voltage Vd−Δ1, the dropped potential immediately returns to the voltage Vd. In case of the soft reset state, the potential of the FD 104 returns to the voltage Vd−Vth_res.

At a time T204, the potential of the drive signal φ110 becomes a high level, and the selection transistor 107 for a read-out line becomes the conduction state.

At a time T205, the potential of the drive signal φ109 becomes a low level and the reset transistor 106 is turned off. The FD 104 is capacitive coupled with a gate of the reset transistor 106, and the potential of the FD 104 is dropped by Δ2 by dropping the potential of the drive signal φ109 from a high level to a low level. In case of the hard reset state, the potential of the FD 104 becomes the voltage Vd−Δ2, and in case of the soft reset state, the potential of the FD 104 becomes the voltage Vh−Vth_res−Δ2. In a case that the transfer transistor is an N-type transistor, the low-level potential of the drive signal φ108 could be a negative potential in order to prevent leakage of the signal charge from the photoelectric conversion unit 102 to the FD 104. Therefore, the potential difference between the low-level potential and the high-level potential of the drive signal φ108 is larger than the potential difference between the low-level potential and the high-level potential of the drive signal φ109, and a relationship of Δ1>Δ2 can be held between the potential dropping amounts Δ1 and Δ2 of the FD 104 due to the coupling.

At a time T206, the transfer transistor 103 is turned on in a state that the reset transistor 106 was turned off, and the signal charge is transferred from the photoelectric conversion unit 102 to the FD 104. A period from the time T203 to the time T206 corresponds to an accumulating period of the signal charge. The potential of the FD 104 is raised by Δ1 due to a fact that the potential of the drive signal φ108 is raised. The potential of the FD 104 becomes the voltage Vd−Δ2+Δ1 (>Vd) in case of the hard reset state and becomes the voltage Vh−Vth_res−Δ2+Δ1 (>Vh−Vth_res) in case of the soft reset state.

In FIG. 2, it is assumed that the light does not enter the photoelectric conversion unit 102 during an accumulating period. Therefore, since the signal charge is not accumulated in the photoelectric conversion unit 102, it is supposed that the charge is not transferred from the photoelectric conversion unit 102 to the FD 104.

At a time T207, the potential of the drive signal φ108 is set to become a low level, and the transfer transistor 103 becomes the non-conduction state, then it is terminated to transfer the signal charge from the photoelectric conversion unit 102 to the FD 104. The potential of the FD 104 is dropped by L1 in accordance with a fact that the potential of the drive signal φ108 is dropped, and the potential of the FD 104 becomes the voltage Vd−Δ2 in case of the hard reset state and becomes the voltage Vh−Vth_res−Δ2 in case of the soft reset state.

At a time T208, the potential of the drive signal φ109 becomes a high level, and the reset transistor 106 becomes the conduction state. The potential of the FD 104 is raised by Δ2 due to a fact that the potential of the drive signal φ109 is raised, and the potential of the FD 104 becomes the voltage Vd in case of the hard reset state and becomes the voltage Vh−Vth_res in case of the soft reset state.

At a time T209, the potential of the drive signal φ110 becomes a low level, and the selection transistor 107 becomes the non-conduction state, then a line selection is released.

A noise is read out during a period from the time T205 to the time T206 then a signal and a noise are read out during a period from the time T207 to the time T208. The amplifier 116 can read only the signal by eliminating the noise by performing a subtraction for both the noise and the signal and noise.

The point to be noted is that the potential of the FD 104 becomes to differ at the time T203 and the time T207, which correspond to the timing, when the transfer transistor 103 becomes the non-conduction state even in cases of the hard reset state and the soft reset state.

When putting the transfer transistor 103 into the non-conduction state, a part of electrons which exist under the gate of the transfer transistor 103 are not transferred to the FD 104, and there is possibility of occurring a phenomenon that the part of electrons return to the photoelectric conversion unit 102. These electrons which return to the photoelectric conversion unit 102 when putting the transfer transistor 103 into the non-conduction state is to be called as return electrons. The number of return electrons at the time T203 when putting the transfer transistor 103 into the non-conduction state after resetting the photoelectric conversion unit 102 is denoted as N_res, and the number of return electrons at the time T207 when putting the transfer transistor 103 into the non-conduction state after transferring the signal charge is denoted as N_tr. At the time T203, the return electrons, of which the number is N_res, exist at the photoelectric conversion unit 102 after putting the transfer transistor 103 into the non-conduction state. At the time T206, the electrons, of which the number is N_res, existing at the photoelectric conversion unit 102 are transferred to the FD 104 by putting the transfer transistor 103 into the conduction state. Thereafter, at the time T207, when putting the transfer transistor 103 into the non-conduction state, the electrons of N_tr pieces among the electrons of N_res pieces return to the photoelectric conversion unit 102. Therefore, in a case that the return electrons are occurred, the electrons of N pieces indicated in the following expression (5) are read out as a spurious signal (aliasing) even in a case that the signal charge does not exist. Incidentally, the influence of the return electrons is not considered to the potential of the FD 104 indicated in FIG. 2. However, the potential change of the FD 104 caused by the return electrons is sufficiently small as compared with the potential amount Δ1 or Δ2.

$$N = N\_res - N\_tr \quad (5)$$

The potential of the FD 104 becomes lower, the electrons which exist under the gate of the transfer transistor 103 come to more easily return to the photoelectric conversion unit 102. That is, there is a property of increasing the number of return electrons. According to FIG. 2, in case of the hard reset state, the potential of the FD 104 just before putting the transfer transistor 103 into the non-conduction state at the time T203 is Vd, and the potential of the FD 104 just before turning off the transfer transistor 103 at the time T207 is Vd−Δ2+Δ1 (>Vd). Therefore, as to the number of return electrons, it becomes to be expressed by N_res>N_tr, and as to the number N, it becomes to be expressed by N>0 in the expression (5). On the other hand, in case of the soft reset state, the potential of the FD 104 just before putting the transfer transistor 103 into the non-conduction state at the time T203 is expressed by Vh−Vth_res+Δ1. The potential of the FD 104 just before putting the transfer transistor 103 into the non-conduction state at the time T207 is expressed by Vh−Vth_res−Δ2+Δ1 (<Vh−Vth_res+Δ1). Therefore, as to the number of return electrons, it becomes to be expressed by N_res<N_tr, and as to the number N, it becomes to be expressed by N<0 in the expression (5).

Further, there is such property that the falling of the drive signal φ108 when putting the transfer transistor 103 into the non-conduction state becomes more rapid, the number of return electrons becomes larger, and the falling of the drive signal φ108 becomes more gradual, the number of return electrons becomes smaller. As in FIG. 1, in a case that the vertical scanning circuit 117 for supplying the drive signal φ108 exists at a left side of a region of the pixels 101, the falling of the drive signal φ108 to be supplied to the pixel 101 at a left side of a screen closer to the vertical scanning circuit 117 is rapid. However, the falling of the drive signal φ108 to be supplied to the pixel 101 at a right side of a screen apart from the vertical scanning circuit 117 is slow downed due to the resistance and the parasitic capacitance of the drive wire 108 and becomes gradual. According to this fact, an absolute value |N| of N in the expression (5) becomes larger at a more left side of a screen and becomes smaller at a more right side of a screen. In case of the hard reset state, since the number N is expressed by N>0 and the absolute value |N| becomes larger at a more left side of a screen, the horizontal directional shading of which an output becomes larger at a more left side of a screen could appear. In case of the soft reset state, since the number N is expressed by N<0 and the absolute value |N| becomes larger at a more left side of a screen, the horizontal directional shading of which an output becomes smaller at a more left side of a screen could be generated.

These horizontal shadings appear because of a fact that the number N does not become such a state of N=0 in the expression (5). In a case that the intense light enters into the photoelectric conversion unit 102 and such a large number of the signal charge capable of ignoring the number N indicated in the expression (5) is generated, the shading is unremarkable. However, under the environment of such low light intensity of only generating the signal charge incapable of ignoring the number N, this case could be a main factor which greatly deteriorates image quality in case of performing the imaging by applying a high gain at the column amplifier 113 illustrated in FIG. 1.

As described above, a cause of appearance of the "horizontal shading" is compactly summarized by the following two points.

(1) A fact that the potential of the FD 104 when putting the transfer transistor 103 into the non-conduction state respectively at the time of terminating the transfer and at the time of terminating the reset becomes to be differed could be the cause of the spurious signal.

(2) The falling gradient of the pulse of the drive signal φ108 when putting the transfer transistor 103 into the non-conduction state could be the factor of influencing the spurious signal amount. Since that gradient is differed in the horizontal direction, the spurious signal amount could be differed in the horizontal direction.

Figure 3:
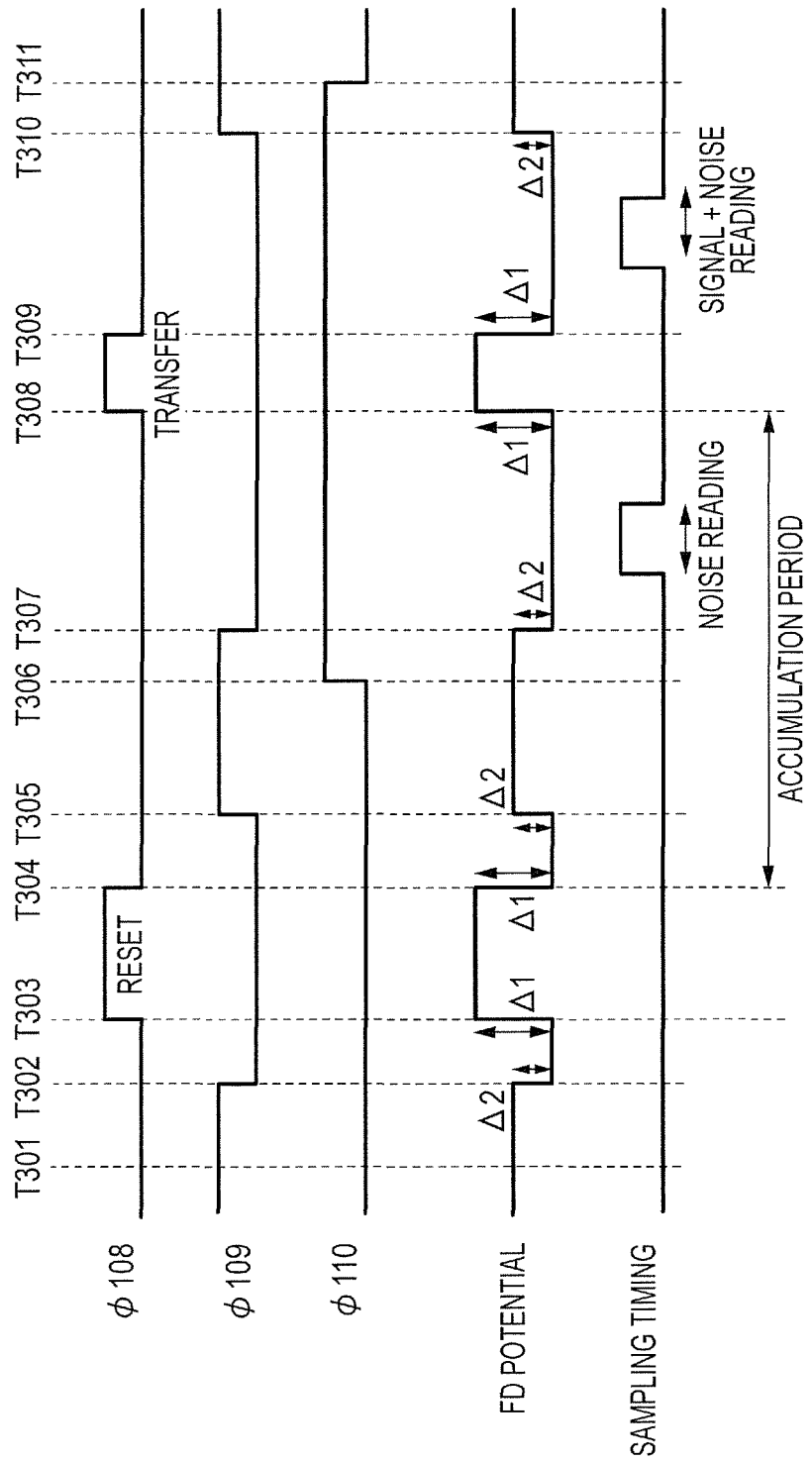
FIG. 3 is a driving timing chart in a second embodiment.

FIG. 3 is a drive timing chart indicating a driving method of a solid-state imaging device according to the first embodiment. This is a drive pulse diagram of one vertical scanning period in a certain frame. A point different from a driving method indicated in FIG. 2 is that the potential of the drive signal φ109 is set to become a low level during a period from a time T302 to a time T305 and the reset transistor 106 is put into the non-conduction state during a period from a time T303 to a time T304, when the photoelectric conversion unit 102 is reset, before starting to accumulate the signal charge.

At a time T301 (first step), the drive signals φ108 and φ110 are in a state of low-level voltage and the drive signal φ109 is in a state of high-level voltage. The FD 104 is reset by putting the reset transistor 106 into the conduction state in a state that the transfer transistor 103 and the selection transistor 107 are in the non-conduction state. The potential of the FD 104 is the voltage Vd at a time of the hard reset state and the voltage Vh−Vth_res at a time of the soft reset state.

Thereafter, the potential of the drive signal φ109 is set to become a low level and the reset transistor 106 is put into the non-conduction state at the time T302. Herewith, the potential of the FD 104 is dropped by Δ2, and the potential becomes the voltage Vd−Δ2 at a time of the hard reset state and becomes the voltage Vh−Vth_res−Δ2 at a time of the soft reset state.

Thereafter, at the time T303 (second step), a reset of the photoelectric conversion unit 102 is started by a process that the potential of the drive signal φ108 is set to become a high level and the transfer transistor 103 is put into the conduction state in a state that the reset transistor 106 is in the non-conduction state. The potential of the FD 104 is raised to the voltage Vd−Δ2+Δ1 in case of the hard reset state and raised to the voltage Vh−Vth_res−Δ2+Δ1 in case of the soft reset state. Since the reset transistor 106 is in the non-conduction state, the potential of the FD 104 is maintained to be the same potential as it is. The potential of the FD 104 in a case that the light is only slightly entered and the horizontal shading becomes remarkable is indicated in FIG. 3. At the time T303, electrons are almost not accumulated in the photoelectric conversion unit 102, and the potential change of the FD 104 due to a fact that electrons are transferred from the photoelectric conversion unit 102 to the FD 104 is ignored.

Thereafter, at the time T304, the potential of the drive signal φ108 is set to become a low level, and a reset of the photoelectric conversion unit 102 is terminated. The potential of the FD 104 is dropped to the voltage Vd−Δ2 in case of the hard reset state and dropped to the voltage Vh−Vth_res−Δ2 in case of the soft reset state.

Thereafter, at the time T305, the FD 104 is reset by a process that the reset transistor 106 is put into the conduction state in a state that the transfer transistor 103 is in the non-conduction state by setting the potential of the drive signal φ109 to become a high level. The potential of the FD 104 becomes the voltage Vd in case of the hard reset state and becomes the voltage Vh−Vth_res in case of the soft reset state.

The potential of the drive signal during a period from a time T306 to a time T311 could be such a potential which is the same as that of the drive signal during a period from the time T204 to the time T209 indicated in FIG. 2. The charge of the photoelectric conversion unit 102 is transferred to the FD 104 by putting the transfer transistor 103 into the conduction state in a state that the reset transistor 106 is in the non-conduction state at a time T308 (third step).

The potential of the FD 104 at the time T304 when the transfer transistor 103 is put into the non-conduction state after the photoelectric conversion unit 102 was reset before starting to accumulate the signal charge and the potential of the FD 104 at the time T309 when the transfer transistor 103 is put into the non-conduction state after the signal charge was transferred can be set to become almost identical with each other. The potential of the FD 104 becomes the voltage Vd−Δ2+Δ1 in case of the hard reset state and becomes the voltage Vh−Vth_res−Δ2+Δ1 in case of the soft reset state. Herewith, the influence by the return electrons in case of performing the reset and the influence by the return electrons in case of transferring the signal charge can be reduced to a low level. More preferably, the number N could be expressed by N=0 in the expression (5) while counteracting the influences each other. Therefore, the horizontal shading can be reduced.

In FIG. 3, although a reset of the photoelectric conversion unit or a reset of the FD is performed only one time in the one vertical scanning period, the reset may be performed plural times. In the present embodiment, an operation described as "reset" may be either "global reset", where the reset of all the lines is terminated at the same time, or "rolling reset", where the reset termination every the line is temporally shifted in order that the time taken from the reset to the read-out is made to be the same time at all the lines. In addition, the "reset" operation according to the present embodiment indicates various operations such as operations of mixing the above-described reset operations, if necessary. At any rate, a condition of the potential of the FD 104 at a time when the reset is terminated is important, and an effect of the present embodiment does not depend on the before and after relationship of the time concerned about how the reset is terminated at every line.

Second Embodiment

Figure 4:
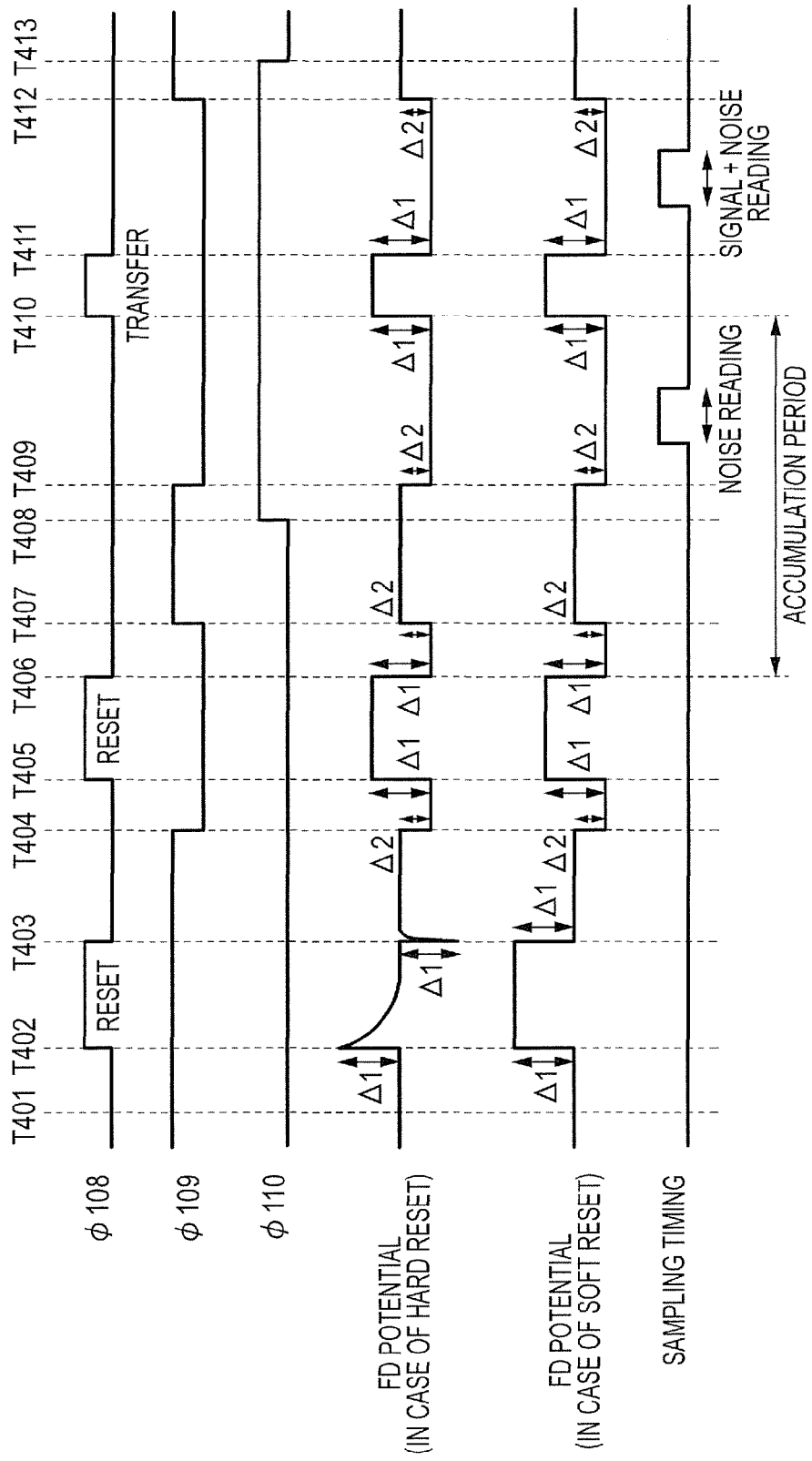
FIG. 4 is a driving timing chart in the second embodiment.

FIG. 4 is a drive timing chart indicating a driving method of a solid-state imaging device according to the second embodiment. The potential of the drive signal during a period from a time T401 to a time T404 could be such a potential which is the same as that of the drive signal during a period from the time T201 to the time T204 indicated in FIG. 2. In addition, the potential of the drive signal during a period from the time T404 to a time T413 could be such a potential which is the same as that of the drive signal during a period from the time T302 to the time T311 indicated in FIG. 3.

In the present embodiment, the reset of the photoelectric conversion unit 102 is performed two times or more before starting to accumulate the signal charge, and the last reset before starting the accumulation is performed in a state that the reset transistor 106 became a non-conduction state, and other reset is performed at least one time in a state that the reset transistor 106 was in a conduction state. In FIG. 4, the reset is performed two times before starting the accumulation, and the first reset is performed in a state that the transfer transistor and the reset transistor 106 were in the conduction state at the same time at least during a certain period. Then the second reset is performed by a process that the reset transistor 106 is put into the non-conduction state after putting into the conduction state then, with that state, the transfer transistor is put into the conduction state. Before the time T403 (T301), the potential of the drive signal φ108 and the drive signal φ109 is set to become a high level during a period from the time T402 to the time T403. Herewith, the photoelectric conversion unit 102 is reset by putting the transfer transistor 103 into the conduction state in a state that the reset transistor 106 is in the conduction state.

The first reset at the time T402 is performed in a state that the reset transistor 106 was in the conduction state. Herewith, even in a case that the intense light is irradiated to the photoelectric conversion unit 102, almost the all surplus charge can be discharged to a drain of the reset transistor 106 at a time of the first reset. Therefore, the potential change of the FD 104 when the final reset was terminated can be ignored.

The number of electrons, which are read out as a spurious signal indicated in the expression (5), is expressed by N=N_res_2−N_tr. Here, the N_res_2 is the number of return electrons at the time T406 when the transfer transistor 103 is put into the non-conduction state after the second reset just before starting the accumulation of the signal charge, and the N_tr is the number of return electrons at the time T411 when the transfer transistor 103 is put into the non-conduction state after transferring the signal charge.

According to the drive indicated in FIG. 4, since the potential of the FD 104 at the time T406 and the potential of the FD 104 at the time T411 are almost identical with each other even in case of the hard reset state and the soft reset state, the number N of electrons can be expressed as N=0. According to a driving method indicated in FIG. 4, problems about a residual image and a noise in a case that the intense light was irradiated and a problem about the horizontal shading in a case that the light is not almost irradiated can be solved at the same time.

Third Embodiment

Figure 5:
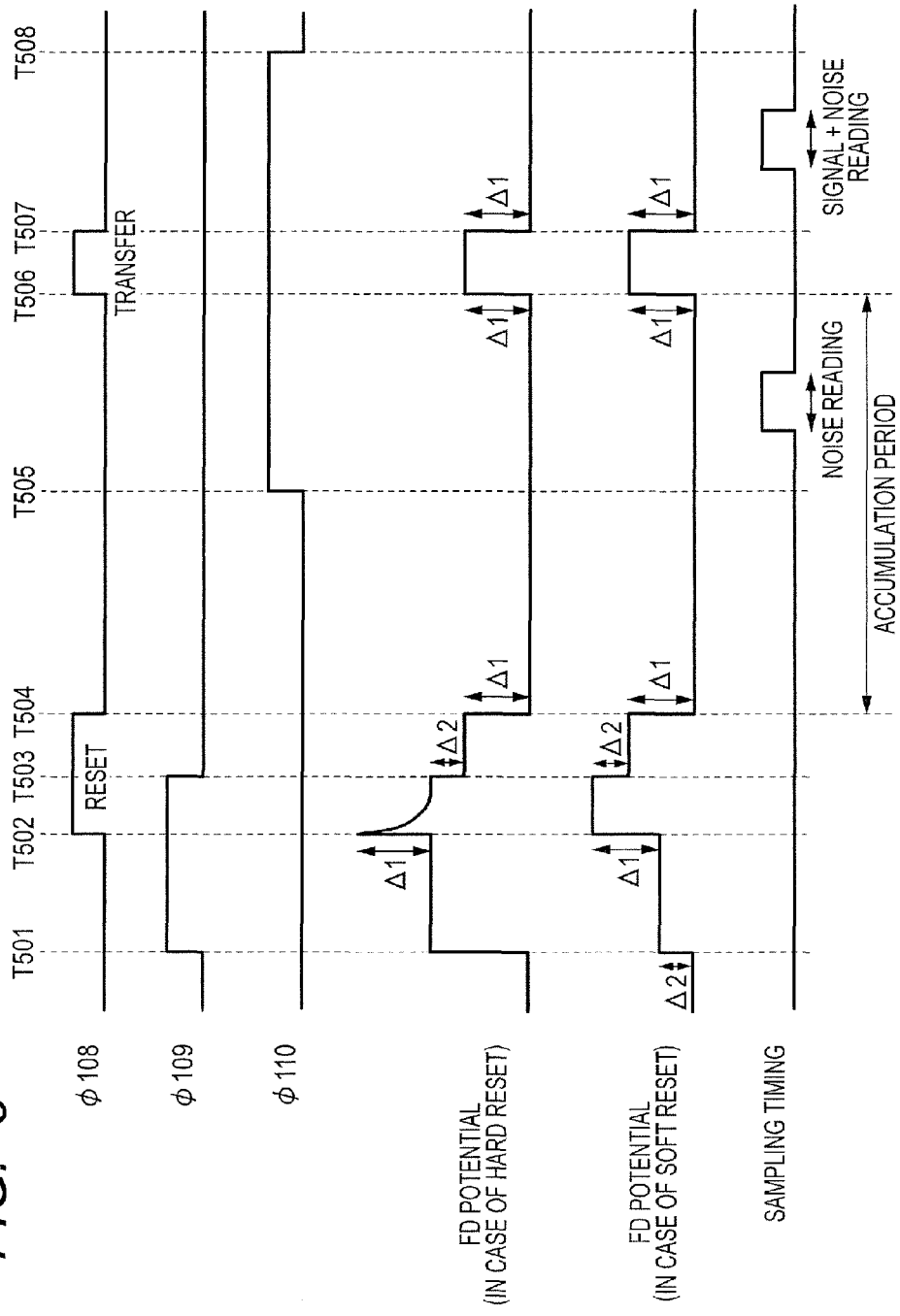
FIG. 5 is a driving timing chart in a third embodiment.

FIG. 5 is a drive timing chart indicating a driving method of a solid-state imaging device according to the third embodiment. In the third embodiment, a reset of the photoelectric conversion unit 102 is started by a process that the transfer transistor 103 is made to be conductive in a state that the reset transistor 106 was in a conduction state before starting to accumulate the signal charge. Then, the reset of the photoelectric conversion unit is terminated by putting the transfer transistor 103 into a non-conduction state after the reset transistor 106 was put into the non-conduction state.

The FD 104 is reset by a process that the potential of the drive signal φ109 is set to become a high level at a time T501 (first step) and the reset transistor 106 is put into the conduction state in a state that the transfer transistor 103 is in the non-conduction state. The potential of the FD 104 becomes the voltage Vd in case of the hard reset state and becomes the voltage Vh−Vth_res in case of the soft reset state.

Thereafter, at a time T502, a reset of the photoelectric conversion unit 102 is started by a process that the potential of the drive signal φ108 is set to become a high level and the transfer transistor 103 is put into the conduction state in a state that the reset transistor 106 is in the conduction state. In case of the hard reset state, since the reset transistor 106 is in the conduction state after the potential of the FD 104 raised to the voltage Vd+Δ1, the potential returns to the voltage Vd. In case of the soft reset state, since the reset transistor 106 is turned off after the potential of the FD 104 raised to the voltage Vh−Vth_res+Δ1, the potential of the FD 104 is maintained as it is. In FIG. 5, only the slight light enters into the photoelectric conversion unit 102, and a case that the influence of electrons, which are transferred to the FD 104 when the transfer transistor 103 was made to be conductive, to the potential of the FD 104 can be ignored is supposed.

Thereafter, at a time T503 (second step), the potential of the drive signal φ109 is set to become a low level, and the transfer transistor 103 is put into the conduction state in a state that the reset transistor 106 is in the non-conduction state. The potential of the FD 104 is dropped to the voltage Vd−Δ2 in case of the hard reset state and dropped to the voltage Vh−Vth_res+Δ1−Δ2 in case of the soft reset state, and the potential is maintained as it is.

Thereafter, at a time T504, the potential of the drive signal φ108 is set to become a low level, and the transfer transistor 103 is put into the non-conduction state, then a reset of the photoelectric conversion unit 102 is terminated. The potential of the FD 104 is dropped to the voltage Vd−Δ2−Δ1 in case of the hard reset state and dropped to the voltage Vh−Vth_res−Δ2 in case of the soft reset state.

Thereafter, at a time T505, the potential of the drive signal φ110 is set to become a high level, and the selection transistor 107 for a line to be read out is made to be conductive.

Thereafter, at a time T506 (third step), the charge of the photoelectric conversion unit 102 is transferred to the FD 104 by a process that the potential of the drive signal φ108 is set to become a high level and the transfer transistor 103 is put into the conduction state in a state that the reset transistor 106 is in the non-conduction state. The potential of the FD 104 is raised to the voltage Vd−Δ2 in case of the hard reset state and raised to the voltage Vh−Vth_res−Δ2+Δ1 in case of the soft reset state. Here, the potential change of the FD 104 due to the transference of the charge accumulated in the photoelectric conversion unit 102 is ignored.

Thereafter, at a time T507, the potential of the drive signal φ108 is set to become a low level, and the transfer transistor 103 is put into the non-conduction state, then the transference of the signal charge is terminated. The potential of the FD 104 becomes the voltage Vd−Δ2−Δ1 in case of the hard reset state and becomes the voltage Vh−Vth_res−Δ2 in case of the soft reset state.

Thereafter, at a time T508, the potential of the drive signal φ110 is set to become a low level, and the selection transistor 107 is put into the non-conduction state, then the line selection is released.

A noise is read out during a period from the time T505 to the time T506 then a signal and a noise are read out during a period from the time T507 to the time T508. The noise is eliminated by a process that the amplifier 116 performs a subtraction for both the noise and the signal and noise, and only the signal can be read out.

The potential of the FD 104 at the time T504 when the transfer transistor 103 is put into the non-conduction state after the photoelectric conversion unit 102 was reset before starting to accumulate the signal charge and the potential of the FD 104 at the time T507 when the transfer transistor 103 is put into the non-conduction state after transferring the signal charge can be set to become almost identical with each other. The potential of the FD 104 becomes the voltage Vd−Δ2 in case of the hard reset state and becomes the voltage Vh−Vth_res−Δ2+Δ1 in case of the soft reset state. Herewith, the number N becomes to be expressed by N=0 in the expression (5), and the horizontal shading can be reduced.

In addition, even in a case that a lot of the charge is accumulated at the photoelectric conversion unit 102 at the time T502, the photoelectric conversion unit 102 can be completely reset during a period from the time T502 to the time T503, when both the reset transistor 106 and the transfer transistor 103 are in the conduction state. Therefore, the problem about a residual image or a noise, which occurs due to a fact that the residual charge remains at the photoelectric conversion unit 102 before starting the accumulation of the signal charge, can be reduced.

In FIG. 5, although a reset of the photoelectric conversion unit 102 is performed only one time before starting the accumulation of the signal charge, the reset may be performed plural times. The final reset of the photoelectric conversion unit 102 before starting the accumulation of signal charge may be performed by a method indicated in FIG. 5, and the transfer transistor 103 may be reset before the above-described reset by such a reset of changing between the conduction state and the non-conduction state in a state that the reset transistor 106 was in the conduction state. In addition, the transfer transistor 103 may be reset by such a reset of changing between the conduction state and the non-conduction state in a state that the reset transistor 106 was in the non-conduction state.

According to the first to third embodiments, the potential of the FD when the transfer transistor was put into the non-conduction state after resetting the photoelectric conversion unit and the potential of the FD when the transfer transistor was put into the non-conduction state after transferring the charge of the photoelectric conversion unit to the FD can be set to become almost identical with each other. The one influence by the return electrons and the other influence by the return electrons can be offset each other. In addition, the horizontal shading (DSNU: Dark Signal Non Uniformity) can be reduced.

Incidentally, the above-described embodiments only indicate embodying examples, and claims have not to be restrictively understood by these examples. That is, claims can be carried out with various patterns without deviating from a technical idea or a main feature thereof.

For example, in the embodiments, it has been described by treating the signal charge as electrons, however a Hall effect can be used for the description. In this case, the respective conductivity semiconductor regions become the anti-conductivity semiconductor regions, and the magnitude correlation of the voltage to be supplied to a control line is reversed.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-270314, filed Dec. 9, 2011, which is hereby incorporated by reference herein in its entirety.

What is claimed is:

1. A driving method of a solid-state imaging device having a plurality of two-dimensionally arranged pixels, wherein
each of the plurality of pixels comprises
a photoelectric conversion unit,
a floating diffusion,
a transfer transistor configured to transfer a charge of the photoelectric conversion unit to the floating diffusion,
an amplifying transistor configured to amplify a signal based on the charge transferred to the floating diffusion, and
a reset transistor configured to reset a voltage of the floating diffusion,
the driving method comprises
a first step of, after putting the transfer transistor into a conduction state, resetting the charge of the photoelectric conversion unit by putting the transfer transistor into a non-conduction state in a non-conduction state of the reset transistor, and
a second step of, after the first step and after putting the transfer transistor into the conduction state, transferring the charge of the photoelectric conversion unit to the floating diffusion by putting the transfer transistor into the non-conduction state in the non-conduction state of the reset transistor, and
the signal based on the charge transferred in the second step is amplified by the amplifying transistor.

2. The driving method according to claim 1, further comprising a third step of, after the first step and before the second step, putting the reset transistor into a conduction state in the non-conduction state of the transfer transistor.

3. The driving method according to claim 2, wherein, after the third step, a noise signal output from the pixel is held outside the pixel.

4. The driving method according to claim 1, further comprising a fourth step of, before the first step, putting the reset transistor into a conduction state in the non-conduction state of the transfer transistor.

5. The driving method according to claim 1, wherein, before the first step, the charge of the photoelectric conversion unit is reset by putting the transfer transistor into the conduction state in a conduction state of the reset transistor.

6. The driving method according to claim 1, wherein, after the first step and before the second step, a signal based on a noise occurred in case of resetting the charge of the floating diffusion is amplified by the amplifying transistor.

7. The driving method according to claim 6, wherein the signal amplified by the amplifying transistor is output outside the pixel.

8. The driving method according to claim 1, wherein, after the second step, the signal based on the charge transferred to the floating diffusion is amplified by the amplifying transistor.

9. The driving method according to claim 8, wherein the signal amplified by the amplifying transistor is output outside the pixel.

10. A driving method of a solid-state imaging device having a plurality of two-dimensionally arranged pixels, wherein
each of the plurality of pixels comprises
a photoelectric conversion unit,
a floating diffusion,
a transfer transistor configured to transfer a charge of the photoelectric conversion unit to the floating diffusion,
an amplifying transistor configured to amplify a signal based on the charge transferred to the floating diffusion, and
a reset transistor configured to reset a voltage of the floating diffusion, and
the driving method comprises
a first step of, after putting the transfer transistor into a conduction state, resetting the charge of the photoelectric conversion unit by putting the transfer transistor into a non-conduction state in a non-conduction state of the reset transistor,
a second step of, after the first step and after putting the transfer transistor into the conduction state, transferring the charge of the photoelectric conversion unit to the floating diffusion by putting the transfer transistor into the non-conduction state in the non-conduction state of the reset transistor,
a third step of, after the first step and before the second step, putting the reset transistor into a conduction state in the non-conduction state of the transfer transistor, and a fourth step of, before the first step, putting the reset transistor into the conduction state in the non-conduction state of the transfer transistor.

11. A solid-state imaging device to which driving is performed by the driving method according to claim 1.

12. A solid-state imaging device to which driving is performed by the driving method according to claim 10.

* * * * *